UNITED STATES PATENT OFFICE.

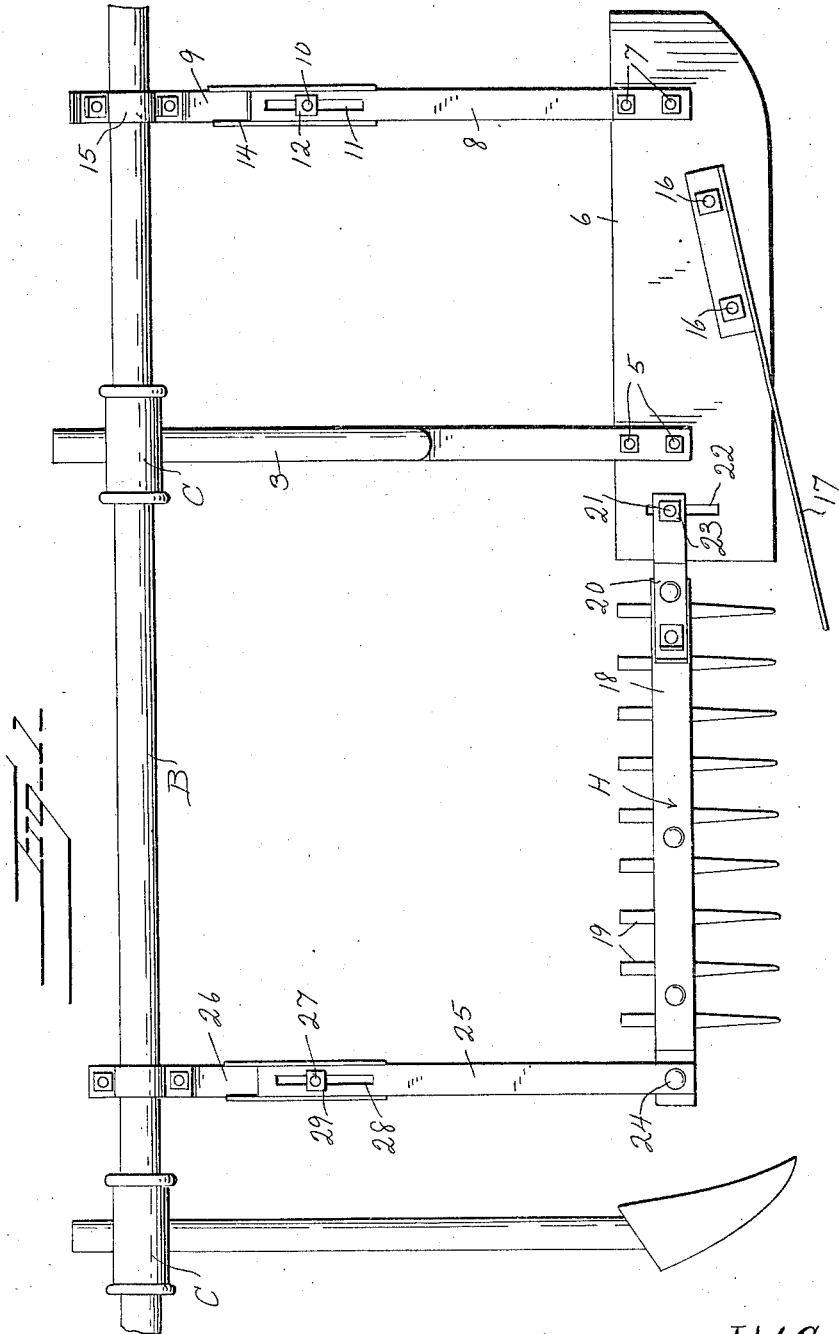

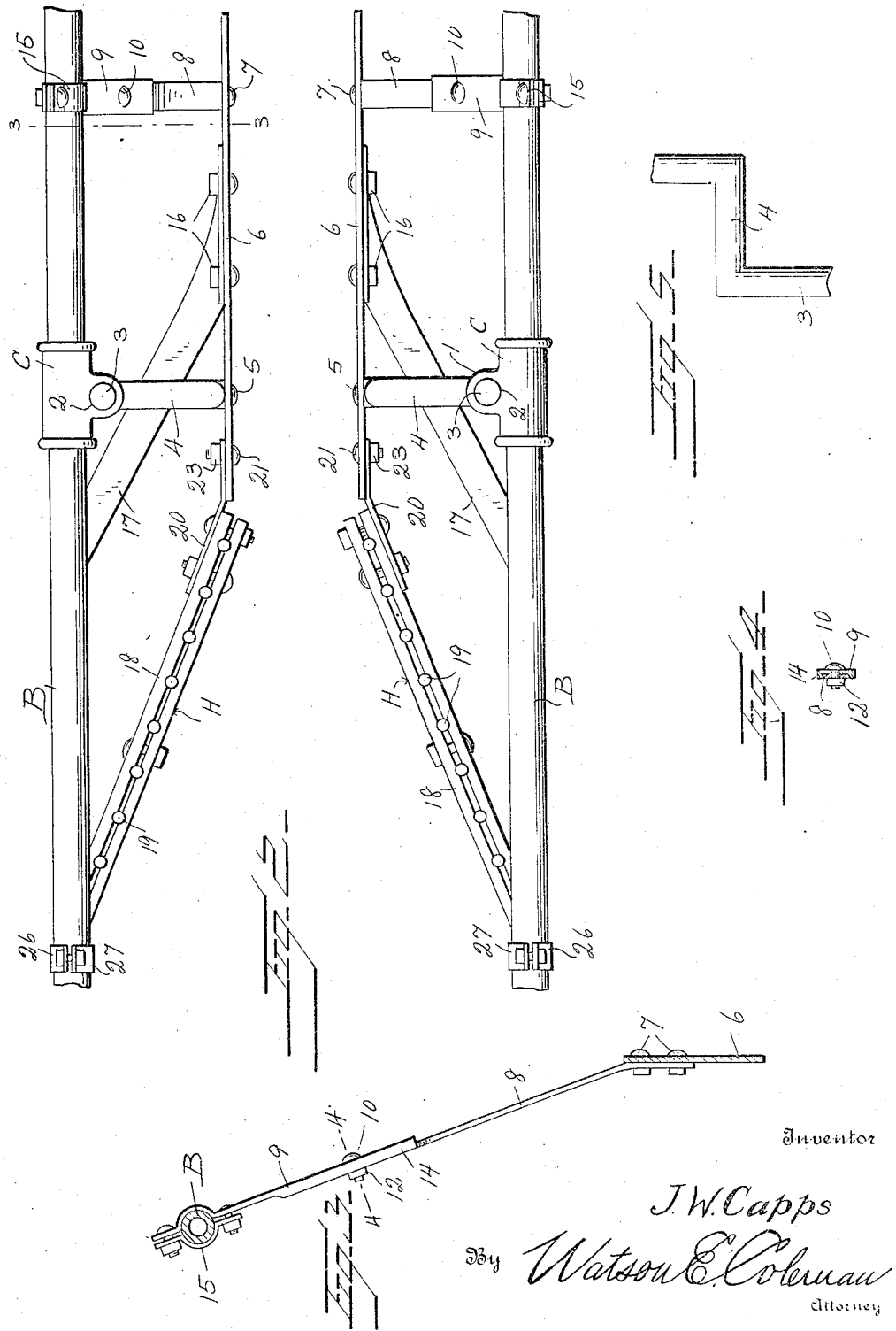

JOSEPH W. CAPPS, OF PYRON, TEXAS, ASSIGNOR OF ONE-HALF TO JOHN C. FARBER, OF PYRON, TEXAS.

CULTIVATOR ATTACHMENT.

1,293,329.  Specification of Letters Patent.  Patented Feb. 4, 1919.

Application filed September 25, 1918. Serial No. 255,624.

*To all whom it may concern:*

Be it known that I, JOSEPH W. CAPPS, a citizen of the United States, residing at Pyron, in the county of Scurry and State of Texas, have invented certain new and useful Improvements in Cultivator Attachments, of which the following is a specification, reference being had to the accompanying drawings.

This invention relates to certain improvements in cultivator attachments, and it is an object of the invention to provide an attachment of this general character having novel and improved means whereby weeds or the like at opposite sides of a row of plants may be effectively and conveniently removed. It is also an object of the invention to provide an attachment of this general character embodying novel and improved means whereby the soil at opposite sides of a row of plants may be subjected to the action of harrows in order to materially facilitate cultivation.

The invention consists in the details of construction and in the combination and arrangement of the several parts of my improved cultivator attachment whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawings, wherein:

Figure 1 is a fragmentary view in side elevation illustrating an attachment constructed in accordance with an embodiment of my invention applied to the beam of a harrow;

Fig. 2 is a view in bottom plan of the structure disclosed in Fig. 1;

Fig. 3 is a sectional view taken substantially on the line 3—3 of Fig. 1;

Fig. 4 is a sectional view taken substantially on the line 4—4 of Fig. 3; and

Fig. 5 is a fragmentary view in elevation of one of the shanks comprised in my attachment as herein set forth.

As disclosed in the accompanying drawings, B denotes cultivator side beams of a conventional construction, and with each of which is operatively engaged the casting C.

The casting C is provided with an inwardly disposed extension 1 provided with a vertically directed opening 2 through which is directed the upper end portion of a shank 3. The central portion of the shank 3 is inwardly offset as at 4, and the lower end portion of said shank 3 is detachably secured, as indicated at 5, to the rear end portion of a ground-engaging member or plate 6. The lower or engaging edge of the member or plate 6 is disposed substantially parallel to the ground being worked.

Detachably secured as at 7 to the forward end portion of each of the plates 6 is an upstanding and inwardly inclined arm or strap 8. The upper end portion of the strap 8 overlaps the lower end portion of a second strap 9. The strap 9 has disposed therethrough at a fixed point a bolt 10, and which bolt is also directed through a longitudinally directed slot 11 formed in the upper portion of the strap 8 engaged with the bolt 10 and having clamping action upon the strap 8 is a nut 12. By this arrangement it will be perceived that the straps 8 and 9 may be longitudinally adjusted one relative to the other in accordance with the necessities of practice. In order to hold the straps 8 and 9 against relative swinging movement about the bolt 10, I find it of advantage to provide the lower longitudinal margins of the strap 9 with the flanges 14 between which the upper portion of the strap 8 snugly fits.

The upper or outer end portion of the strap 9 is suitably clamped as indicated at 15 with an adjacent beam B at a predetermined point in advance of the casting C.

Detachably secured as at 16 with the outer face of each of the ground-engaging members or plates 6 is a weed cutting blade or knife 17 disposed rearwardly and outwardly on a predetermined incline. In practice the plates are positioned at opposite sides of a row of plants and in close proximity thereto, and as the cultivator advances the knives 17 operate effectively to remove weeds or the like which may be growing between the rows and which would otherwise interfere with the plants being cultivated.

In order to further treat the soil at opposite sides of a plant row, I find it of advantage to employ in connection with each of the members or blades 6 a harrow member H. As herein disclosed, each of the harrow members H comprises two elongated plates 18 between which are clamped the harrow teeth 19. The forward end portion of one of the blades 18 has fixed thereto a coupling plate 20 which overlies the outer face of the plate or member 6 at the rear or heel portion thereof. Disposed through the outer or free portion of the coupling plate 20 at a fixed point is a bolt 21 which is also directed through a vertically disposed slot 22 produced in the plate 6. Threaded upon the bolt 21 is a clamping nut 23. The bolt 21 and slot 22 affords means whereby the connection between the harrow H and the plate 6 may be adjusted vertically as the occasions of practice may require.

Secured as at 24 to the rear end portion of the blade 18 of each of the harrow sections 8 is an upstanding strap 25. The upper end portion of said strap 25 overlies the lower end portion of a strap 26 depending from a beam B. Disposed through the strap 26 at a fixed point is a bolt 27 which is also directed through a longitudinally disposed slot 28 formed in the upper end portion of the strap 25 and threaded upon said bolt 27 is a clamping nut 29. By this means the straps 25 and 26 may be longitudinally adjusted one relative to the other in accordance with the necessities of practice.

The upper end portion of each of the straps 26 is clamped as at 27 to a beam B as is believed to be clearly illustrated in the accompanying drawings.

From the foregoing description, it is thought to be obvious that a cultivator attachment constructed in accordance with my invention is particularly well adapted for use by reason of the convenience and facility with which it may be assembled and operated, and it will also be obvious that my invention is susceptible of some change and modification without departing from the principles and spirit thereof, and for this reason I do not wish to be understood as limiting myself to the precise arrangement and formation of the several parts herein shown in carrying out my invention in practice except as hereinafter claimed.

I claim:

1. In combination with the beam of a cultivator, a ground-engaging member supported by said beam and a harrow member supported at one end by the rear portion of the ground-engaging member and at its opposite end portion by the beam.

2. In combination with the beam of a cultivator, a ground-engaging member supported by said beam and a harrow member supported at one end by the rear portion of the ground-engaging member and at its opposite end portion by the beam, the connection between the harrow and the beam being adjustable.

3. In combination with the beam of a cultivator, a ground-engaging member supported by said beam and a harrow member supported at one end by the rear portion of the ground-engaging member and at its opposite end portion by the beam, the connection between the harrow and the ground-engaging member being adjustable vertically of the ground-engaging member.

In testimony whereof I hereunto affix my signature in the presence of two witnesses.

J. W. CAPPS.

Witnesses:
  JOE ADAMS,
  JOHN C. FARBER.

Copies of this patent may be obtained for five cents each, by addressing the "Commissioner of Patents, Washington, D. C."